(12) United States Patent
Dawley

(10) Patent No.: US 10,680,226 B2
(45) Date of Patent: Jun. 9, 2020

(54) BATTERY ASSEMBLY HAVING PCBA WITH CELL MONITORING AND WELDING ASSEMBLY FEATURES

(71) Applicant: GM Global Technology Operations LLC, Detroit, MI (US)

(72) Inventor: Evan J. Dawley, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 137 days.

(21) Appl. No.: 15/979,900

(22) Filed: May 15, 2018

(65) Prior Publication Data
US 2019/0355954 A1    Nov. 21, 2019

(51) Int. Cl.
| | |
|---|---|
| *H01M 2/20* | (2006.01) |
| *H01M 2/02* | (2006.01) |
| *H01M 10/42* | (2006.01) |
| *H01M 2/26* | (2006.01) |

(52) U.S. Cl.
CPC ............. *H01M 2/202* (2013.01); *H01M 2/02* (2013.01); *H01M 2/26* (2013.01); *H01M 10/425* (2013.01); *H01M 2010/4271* (2013.01)

(58) Field of Classification Search
CPC . H01M 10/425; H01M 10/4257; H01M 2/202
See application file for complete search history.

(56) References Cited

U.S. PATENT DOCUMENTS

| | | | | |
|---|---|---|---|---|
| 3,868,770 A | * | 3/1975 | Davis .................. | H05K 3/4084 29/837 |
| 6,724,170 B1 | * | 4/2004 | Maggert ............... | H01M 2/202 320/107 |
| 2007/0238018 A1 | * | 10/2007 | Lee ..................... | H01M 2/1077 429/159 |

* cited by examiner

*Primary Examiner* — Olatunji A Godo
(74) *Attorney, Agent, or Firm* — Quinn IP Law

(57) ABSTRACT

A battery assembly includes a battery cell, conductive bus bar, and printed circuit board assembly (PCBA). A cell tab of the battery assembly has a first portion extending from a perimeter edge of a pouch and a second portion arranged orthogonally with respect to the first portion. The bus bar defines a tab slot through which the first portion extends, and has a major surface adjacent to the second portion. The PCBA defines an elongated welding window orthogonal to a longitudinal axis of the PCBA. The PCBA is mounted over the bus bar such that surface area of the second portion is exposed through the welding window, and in turn is welded to the bus bar through and within the welding window. A spring element may be positioned between the carrier frame and the PCBA. A method of making the battery assembly is also provided.

18 Claims, 4 Drawing Sheets

BATTERY ASSEMBLY HAVING PCBA WITH CELL MONITORING AND WELDING ASSEMBLY FEATURES

INTRODUCTION

Electrochemical batteries are used in a wide variety of systems. A battery assembly may be constructed of multiple interconnected sections, with each cell stack including several interconnected battery cells. The individual battery cells may be placed adjacent to a cooling plate and spaced apart from adjacent battery cells by a foam layer. An electrode foil stack-up internal to the battery cell may also include a thin layer of insulating material, e.g., polyethylene and/or polypropylene film, disposed between the oppositely-charged electrode foils. The entire stack-up may be enclosed within a sealed outer pouch containing an electrolyte material.

The electrode foils noted above, generally referred to as anode and cathode foils, may be coated with an application-suitable active material such as lithium oxide or graphite. External cell tabs that are electrically connected to the electrode foils protrude a short distance out from an outer perimeter edge of the pouch. The protruding cell tabs are conductively joined together to form a series or parallel electrical circuit, with an application-specific number of battery cells electrically interconnected via a conductive bus bar to construct the battery assembly.

Cell stack-ups having the above-noted pouch construction may have a cell tab configuration that may be either symmetrical or asymmetrical. In a symmetrical tab configuration, the cathode and anode tabs of a given battery cell protrude from diametrically-opposite perimeter edges of the pouch. In contrast, the cell tabs of an asymmetrical battery cell protrude from the same perimeter edge, such that the anode and cathode tabs of a given battery cell are arranged side-by-side. While both cell tab configurations provide relative performance and/or packaging benefits, the geometry of the symmetrical tab configuration may be used to construct batteries having a relatively high power density.

SUMMARY

A battery assembly is disclosed herein that uses the symmetrical cell tab configuration noted above. In an exemplary embodiment, the battery assembly includes at least one battery cell, at least one conductive bus bar, and a printed circuit board assembly (PCBA). The battery cell, being symmetrical, has a cell tab protruding from a perimeter edge of the pouch. The cell tab also includes a first portion extending outward from the perimeter edge of the pouch and a second portion that is arranged orthogonally with respect to the first portion. For instance, the cell tab may be folded or bent during manufacturing, e.g., using a roller, so as to form the first and second portions. The conductive bus bar defines a cell tab slot, with the first portion extending through the tab slot. A major surface of the conductive bus bar is immediately adjacent to the second portion of the cell tab.

The PCBA in this embodiment defines an elongated welding window that is orthogonally arranged/transverse with respect to a longitudinal axis of the PCBA. The PCBA is mounted over or on top of the conductive bus bar such that the welding window of the PCBA overlaps and is coextensive surface area of the second portion of the cell tab, which is exposed or accessible for welding through the welding window. The second portion of the cell tab is then welded to the conductive bus bar along a length of the welding window, e.g., using a laser welding process.

The battery assembly may include a carrier frame configured to support and retain the conductive bus bar, and a resilient spring element that forms part of the PCBA and is positioned adjacent to the carrier frame. The resilient spring element may be arranged transverse to the longitudinal axis of the PCBA such that the spring element spans a portion of the width of the PCBA. Such a spring element may define another elongated welding window that is overlapped by/coextensive with the welding window of the PCBA.

The PCBA may optionally define radially-extending edge notches, i.e., notches in a perimeter edge of the PCBA and/or a profile of an overmolded plastic layer, that open away from the longitudinal axis. The resilient spring element in such an embodiment is part of the PCBA, and does not directly interface to the carrier frame. The spring element may include a set of tabs that are soldered to the PCBA.

In some embodiments, the cell tab and the conductive bus bar may be constructed of different materials, such as aluminum and copper, respectively.

A PCBA is also disclosed for use with a battery assembly having a battery cell, with the battery cell including a cell tab with orthogonally-arranged first and second portions as noted above. The battery assembly contemplated by this embodiment of the PCBA includes a conductive bus bar defining a tab slot through which the first portion extends. The PCBA includes a first layer having conductive traces, as well as surface or through-hole soldered components, and a second layer that is over-molded to the first layer. The first and second layers define an elongated welding window that is orthogonally arranged with respect to the longitudinal axis of the PCBA. The welding window of the PCBA is configured such that, when the PCBA is mounted or positioned relative to the conductive bus bar, surface area of the second portion of the cell tab is exposed through the welding window. This positioning enables welding access to the second portion through the welding window of the PCBA in a subsequent welding process.

A method is also disclosed herein for forming the battery assembly. The method may include inserting first and second portions of a cell tab of the battery cell through a tab slot defined by the conductive bus bar, and then bending the cell tab sufficiently to orient the second portion orthogonally with respect to the first portion. A major surface of the bus bar is then immediately adjacent to the second portion of the cell tab, i.e., the second portion rests on the major surface. When a plurality of the cell tabs are used as part of the battery assembly, the cell tabs are rolled or bent in the same direction.

The method in this embodiment may also include mounting PCBA on top of or over the conductive bus bar, with the PCBA having a longitudinal axis and an elongated welding window that is orthogonally arranged with respect to the longitudinal axis, such that surface area of the second portion of the cell tab is exposed through the welding window. The method may also include welding the second portion of the cell tab to the conductive bus bar along a length of the welding window.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
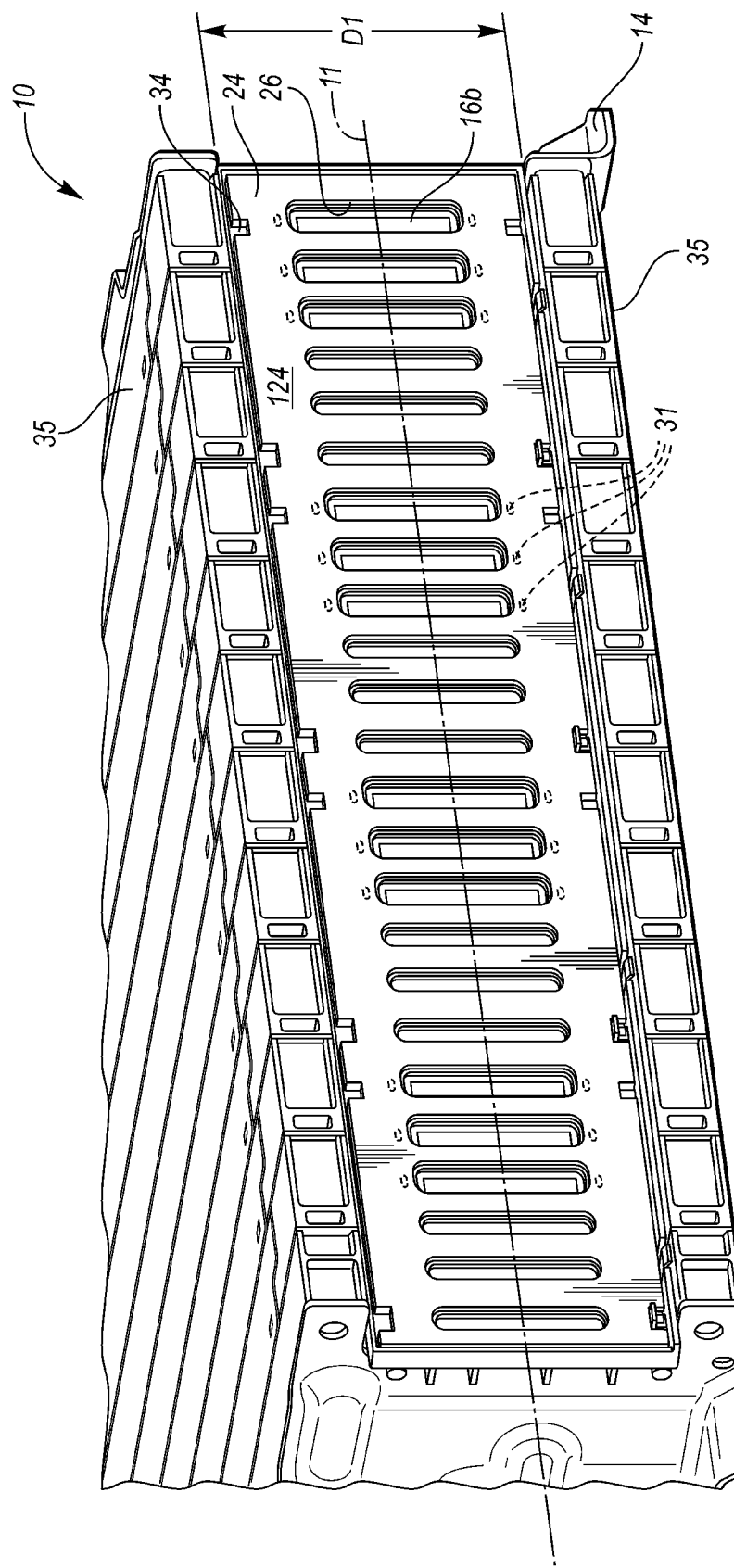
FIG. 1 is a schematic perspective view illustration of a portion of an example battery assembly having a printed circuit board assembly (PCBA) with integral cell monitoring hardware and welding assembly features facilitating a laser welding process as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 2:
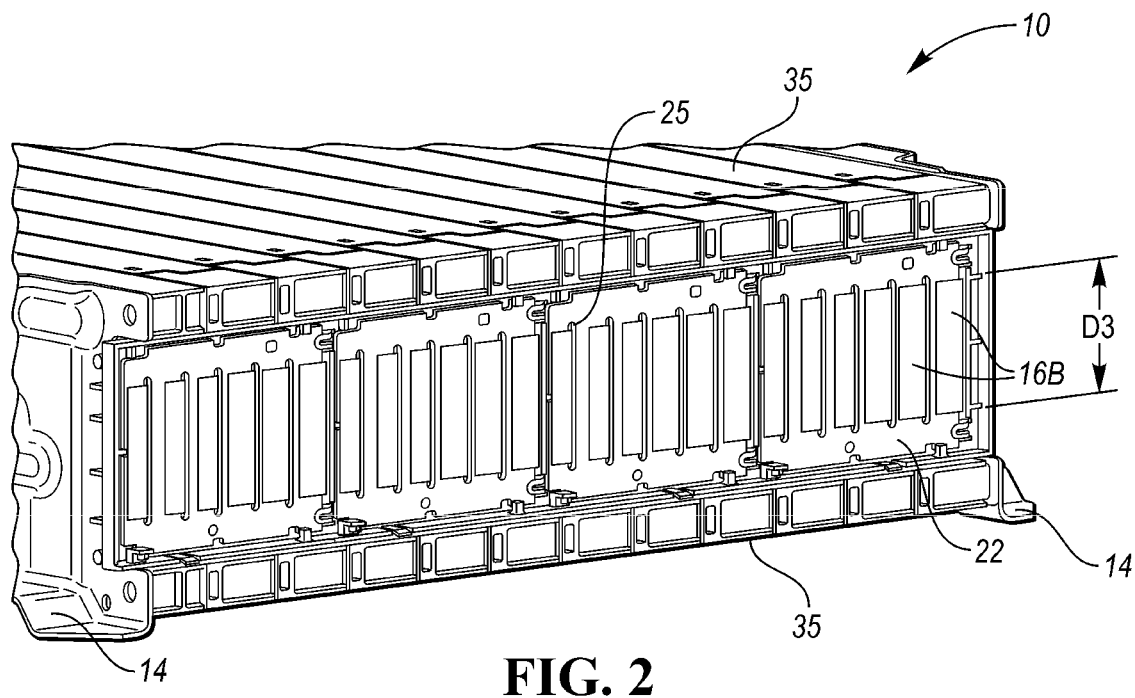
FIG. 2 is schematic perspective view illustration of the battery assembly of FIG. 1 with the PCBA omitted to depict underlying conductive bus bars and cell tabs.
Figure 5:
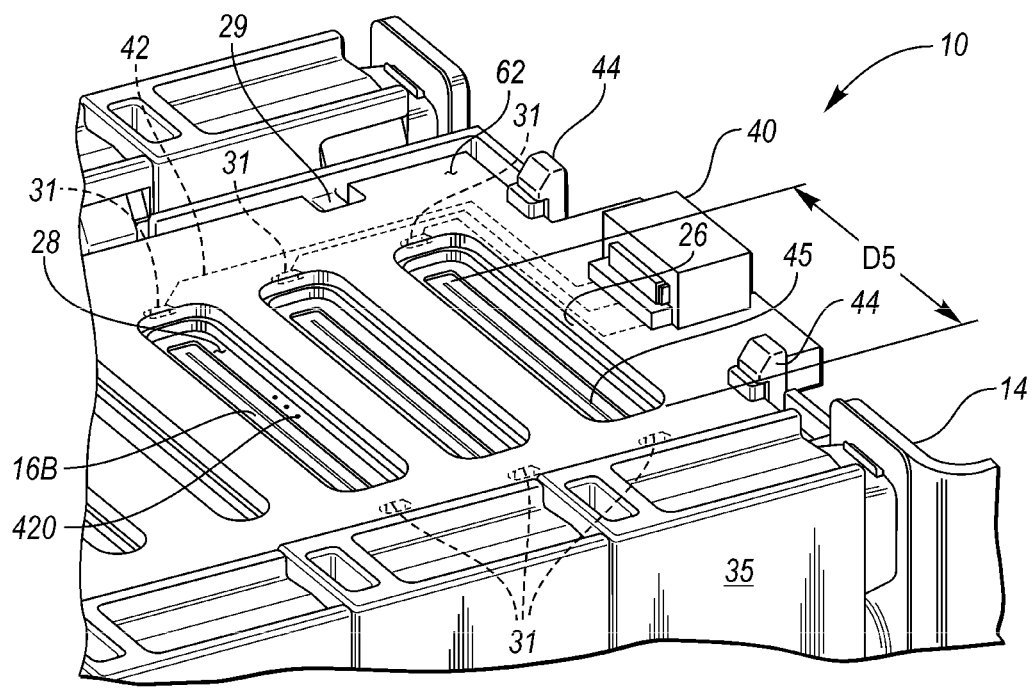
FIG. 5 is a schematic perspective view illustration of an end portion of the battery assembly depicted in FIGS. 1 and 2.

Referring to the drawings, wherein like reference numerals are used to identify like or identical components in the various views, an example battery assembly 10 having side plates 14 and a repeating frame assembly 35 is depicted in FIGS. 1, 2, and 5, with the repeating frame assembly 35 having rigid repeating frame and cooling fins or channels, as will be appreciated by one of ordinary skill in the art. A top portion of the battery assembly 10 is shown in FIG. 1, with the battery assembly 10 shown in a horizontal orientation for illustrative clarity. Such a battery assembly 10 may be used as a power source in various systems, including automotive vehicles, marine craft, aerospace vehicles, mobile platforms, or powerplants, without limitation.

Figure 3A:
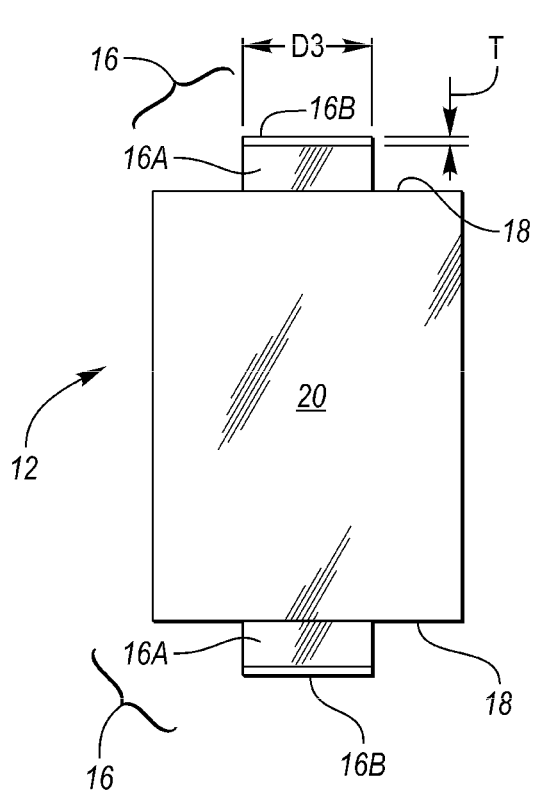
FIG. 3A is a schematic plan view illustration of an example battery cell configured for use in the battery assembly of FIGS. 1 and 2.
Figure 3B:
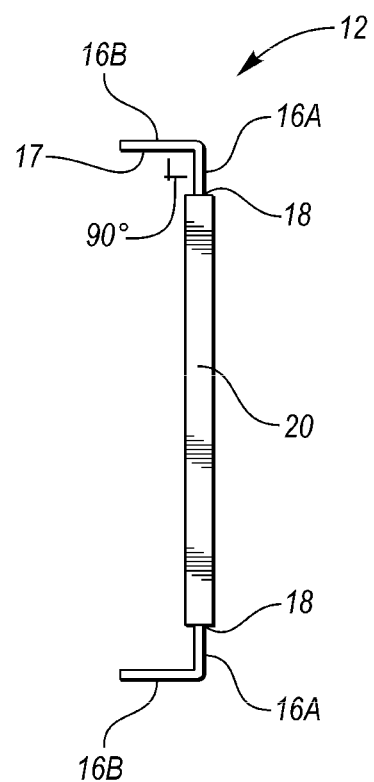
FIG. 3B is a schematic side view illustration of the example battery cell of FIG. 3A.

The battery assembly 10 includes one or more battery cells 12 configured as shown in FIGS. 3A and 3B. Within the overall construction of the battery assembly 10 of FIG. 1, the battery cells 12 are positioned between the repeating frame assemblies 35, with the repeating frame assemblies 35 flanking the battery cells 12. Side plates 14 may be constructed of plastic, extruded aluminum, stamped steel, or another lightweight, structurally rigid material configured to form a protective and structurally supportive outer housing. The number of battery cells 12 used in a given application may vary, and therefore the battery assembly 10 of FIG. 1 is non-limiting and exemplary of the present teachings.

The battery assembly 10 disclosed herein includes a printed circuit board assembly (PCBA) 24 having a major surface 124. The PCBA 24 is depicted in FIG. 1 in an installed position, with the PCBA 24 omitted in FIG. 2 to show relative positions of a plurality of underlying conductive bus bars 22. Also shown in FIGS. 1 and 2 are exposed tab portions 16B of the cell tabs 16 shown in FIGS. 3A and 3B, with the exposed tab portions 16B being aligned in a single column or row indicative of the symmetrical cell tab configuration noted previously hereinabove.

The exposed tab portions 16B of FIGS. 1 and 2 are disposed so as to rest directly on and thus immediately adjacent to the conductive bus bars 22 (FIG. 2). The conductive bus bars 22, which may be embodied as flat plates of an application-suitable conductive metal such as copper and/or aluminum, collectively form electrical connections between groups of cell tabs 16. In some embodiments, the conductive bus bars 22 and the cell tabs 16 may be constructed of the same material, while in others the materials may be different. For instance, when the cell tabs 16 are constructed of aluminum, which is typical in a cathode tab, the conductive bus bar 22 to which such cell tabs 16 are joined may be constructed of copper. The conductive bus bar 22 may be constructed solely of aluminum, with the cell tab 16 forming the anode tab in such an embodiment being laser welded to the conductive bus bar 22. Likewise, the conductive bus bar 22 may be bi-metallic, e.g., half copper and half aluminum, with the copper cell tabs 16 (anode tabs) welded to the copper portion of the bus bar 22 and aluminum cell tabs 16 (cathode tabs) welded to the aluminum portion of the bus bar 22.

The PCBA 24 shown in FIG. 1 as described herein serves two important functions: (1) providing internal electrical traces and connections needed to properly monitor the ongoing performance of the battery assembly 10, and (2) facilitating a subsequent laser welding process. The latter function is facilitated by configuring the PCBA 24 to press the exposed tab portions 16B of the cell tabs 16 against the conductive bus bars 22 to provide a good, continuous electrical contact interface, as well as to retain the exposed tab portions 16B in a suitable position for subsequent welding of the exposed tab portions 16B to the conductive bus bars 22.

Referring briefly to FIGS. 3A and 3B, the battery cells 12 contemplated herein for use in the battery assembly 10 of FIG. 1 may include a pouch 20, e.g., a polymer-coated foil pouch. Although omitted for illustrative simplicity, as described above such a pouch 20 may contain an electrolyte material surrounding an internal cell stack-up in which a thin layer of insulating material is disposed between oppositely-charged electrode foils, i.e., anode and cathode foils. The foils terminate in a charge-specific cell tab 16 (FIG. 3A). The cell tabs 16 may be embodied as thin foil sheets, e.g., having a thickness (T) of about 0.2-0.4 mm in some embodiments, with the thickness (T) based on the electrical resistivity of the particular material used to form the cell tabs 16. A tab portion 16A of a given cell tab 16 protrudes from diametrically-opposed perimeter edges 18 of the pouch 20 such that the battery cell 12 has the symmetrical tab configuration noted above.

Figure 4:
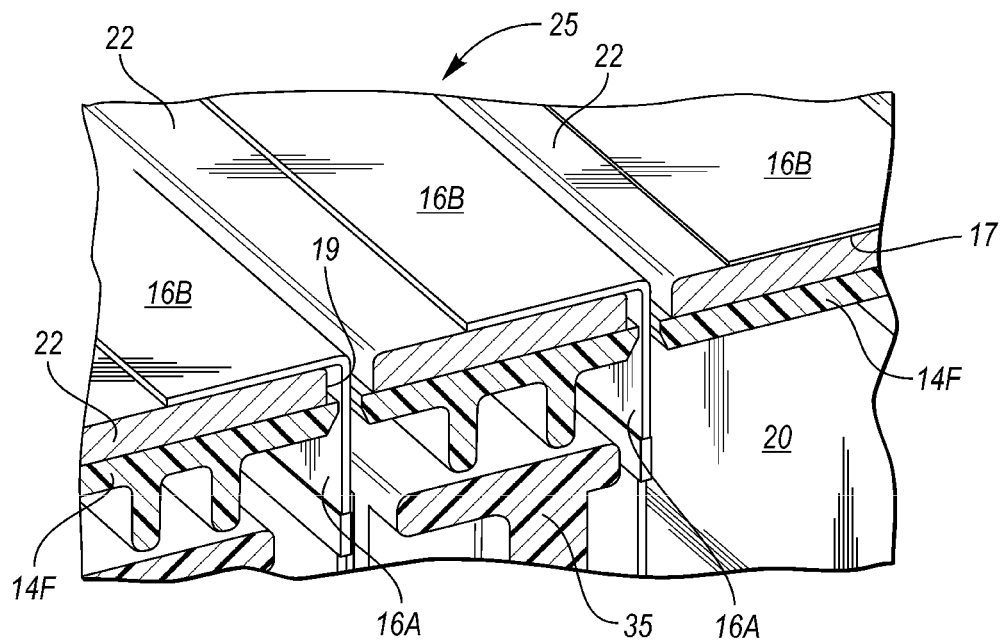
FIG. 4 is a schematic partial cross-sectional view illustration of a portion of the battery assembly shown in FIGS. 1 and 2.

As best shown in FIG. 3B and FIG. 4, with FIG. 4 being a cross-sectional view taken along a longitudinal axis 11 of the battery assembly 10 of FIG. 1 and also depicting repeating frames 35 between adjacent pouches 20, the cell tabs 16 may be rolled or bent, all in the same direction, during manufacturing to form an angle of approximately 90°, as also indicated in FIG. 3B. For instance, a cylindrical roller 50 as shown in FIG. 2 may be passed along the longitudinal axis 11 in direct rolling contact with exposed tab portions 16B to gently fold or bend the cell tabs 16 against an edge 19 of a respective tab slot 25 defined by the conductive bus bar 22, with such tab slots 25 also depicted in FIG. 2. Afterward, the cell tab 16 has the orthogonally-arranged tab portions 16A and 16B shown in FIGS. 3A and 3B.

Tab portion 16A of the cell tab 16 shown in FIG. 3B thus extends a short distance outward from the perimeter edge 18 of the pouch 20, i.e., just far enough to clear the conductive bus bar 22 shown in FIGS. 2 and 4. The tab portion 16B, referred to herein as the "exposed" tab portion 16B to indicate its exposed position with respect to the PCBA 24 of FIG. 1, is continuous with and arranged orthogonally with respect to tab portion 16A. The exposed tab portion 16B includes a contact surface 17 that rests on or is pressed directly onto the conductive bus bar 22.

As shown in FIG. 4, the conductive bus bars 22 rest on or are supported by a carrier frame 14F, e.g., a plastic tray or plate connected to and extending between the side plates 14 shown in FIGS. 1 and 2, with contact surface 17 being immediately adjacent to the conductive bus bar 22. The mutually orthogonal arrangement of tab portion 16A and exposed tab portion 16B, which ultimately results in a lap joint, is intended to increase a weldable area and thereby facilitate a subsequent welding process of the exposed tab portion 16B of the cell tab 16 to the conductive bus bar 22 as set forth below.

Figure 6A:
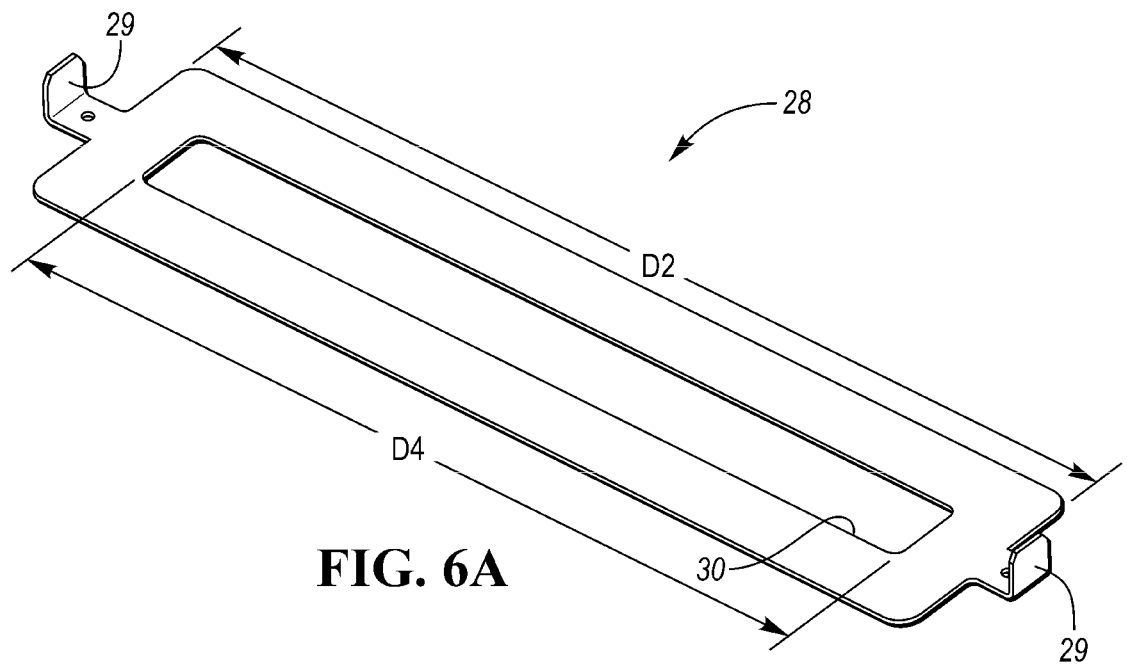
FIG. 6A is a schematic perspective view illustration of an exemplary stamped spring element usable within the battery assembly shown in FIGS. 1, 2, and 5.
Figure 6B:
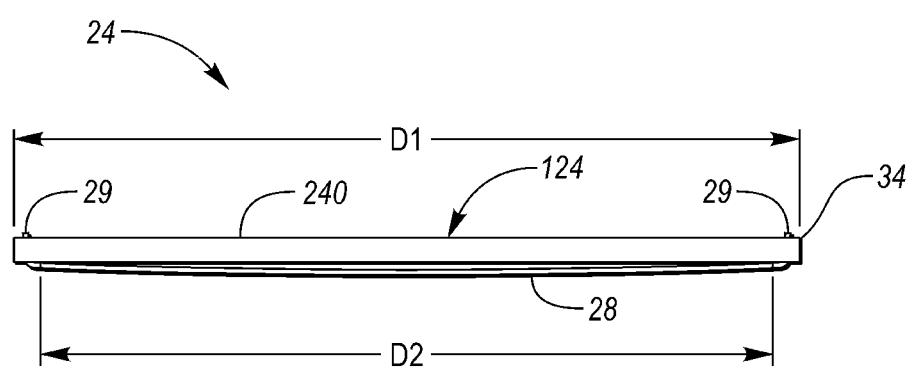
FIG. 6B is a schematic side view illustration of the stamped spring element shown in FIG. 6A.

Referring again to the battery assembly 10 of FIG. 1, the PCBA 24 may be configured as a unitary elongated cell sense board providing electrical current and/or voltage sensing functions when used for monitoring the ongoing electrical and thermal performance of the battery assembly 10. While omitted from the drawings for illustrative clarity, the PCBA 24, also referred to as a cell sense board or interconnect board, may contain various voltage, current, resistance sensors, and/or temperature sensors, as well as internal or surface conductive traces needed for measuring and reporting electrical voltage, current, resistance, temperature, and/or other performance values, e.g., to an external battery assembly controller (not shown). The PCBA 24 may also include application-specific integrated circuits (ASICs) for locally monitoring and balancing the state of charge of the battery cells 12, as well as for communicating via controller area network (CAN) bus messaging or other communications protocols. Solder points 31 represent through-hole solder points to an optional resilient spring element 28 as shown in FIGS. 6A and 6B and described below. Those of ordinary skill in the art will appreciate that a circuit board such as the PCBA 24 also ordinarily includes multiple layers, conductive vias, sensors, surface traces, and embedded traces, many of which are omitted from the drawings for illustrative simplicity.

As noted above, the PCBA 24 is configured to physically press the exposed tab portions 16B of the cell tabs 16 against the conductive bus bars 22. To this end, the PCBA 24 of FIG. 1 may define elongated welding windows 26, e.g., parallel slotted openings as shown, with one welding window 26 used per exposed tab portion 16B. Thus, the exposed tab portion 16B is "exposed" in the sense of being substantially visible or readily accessible through the welding window 26 during a subsequent welding process as noted above.

The welding windows 26 have an orientation that is orthogonal with respect to the longitudinal axis 11. The outer perimeters of the welding windows 26 may define an elongated oval-shape as shown or a rectangular shape in other embodiments. Irrespective of the perimeter shape, the welding windows 26 are sized so as to expose, i.e., present to a welding laser without intervening structure, a majority (51 percent or more) of the total surface area of exposed tab portions 16B. The PCBA 24 is installed in the battery assembly 10 directly on top of the cell tabs 16 as shown in FIG. 1, e.g., using mechanical fasteners such as snaps or screws, or other plastic joining processes such as laser, ultrasonic, or heat-staking, to thereby lock the PCBA 24 into place.

Referring briefly to FIGS. 6A and 6B, the resilient spring element 28 noted briefly above may be used as an integral part of the PCBA 24 of FIG. 1. The spring element 28 may be constructed from a lightweight stamped metal, e.g., beryllium copper or other high-strength copper with good formability, with the thickness and level of resilience or compliance sufficient for compensating for manufacturing tolerances and resultant space between the PCBA 24 and the cell tabs 16. Integrating the spring element 28 of FIGS. 6A and 6B with the remainder of the PCBA 24 thus enables the PCBA 24, when eventually fastened to the battery assembly 10, to securely clamp the exposed tab portions 16B of the cell tabs 16 to a respective one of the conductive bus bar 22 in preparation for a welding process.

As shown in FIG. 6A, which depicts the optional resilient spring element 28 as it would appear when in a flattened state subsequent to installation in the battery assembly 10 of FIG. 1, defines an elongated welding window 30 that aligns with one of the elongated welding windows 26 of the PCBA 24 shown in FIG. 1. The spring element 28 may include a pair of end tabs 29 that protrude radially outward from the spring element 28 and are soldered to the PCBA 24 at the solder points 31 shown for clarity in FIG. 5. The solder points 31 may be connected via traces 42 to an electrical connector 40. For instance, a length (dimension D2) of the spring element 28 may be slightly less than a total width of the PCBA 24, i.e., dimension D1 of FIGS. 1 and 6B, with the end tabs 29 soldered to the PCBA 24 on or along the outer perimeter of the PCBA 24 shown in FIG. 1. Dimension D4 may be less than the width of the cell tab 16, with dimension D3 in FIGS. 2-3A representing such a width, although dimension D4 may exceed dimension D3 with sufficient process control to correctly place the weld within the welding window 30.

FIG. 5 depicts a resultant configuration of the battery assembly 10 after the PCBA 24 is installed, e.g., using snap-fit connections 44 or threaded fasteners, and after welding of exposed portion 16B of the cell tabs 16 (FIGS. 3A and 3B) is completed. The elongated welding windows 26 expose or present a majority of the surface area of exposed portions 16B for welding, such that an elongated welded joint 45 may be formed along a length of each of the welding windows 26. A length or overall weld area of such a welded joint 45 is noted by dimension D5 in FIG. 5, and provides sufficiently low current density and low overall resistance between the adjoining bus bar 22 and cell tab 16. Additionally, dimension D5 is constrained to be within a length of the welding window 30 of FIG. 6A, with such a length indicated by dimension D4.

The PCBA 24 may be constructed in multiple layers. For instance, as shown in FIG. 6B the PCBA 24 includes a PCBA substrate or board 240 that is overmolded, e.g., by a plastic layer 62, which is disallowed in the welding windows 26 and 30 and omitted in the view of FIG. 6B solely for illustrative clarity. Optional secondary weld point 420, which may be used to permanently join the spring element 28 to exposed tab portion 16B, are depicted as being exposed within the welding windows 26, are laser welded in place as needed for forming permanent cell sensing connections between cell tab 16 and the PCBA 24. Weld points 420 are positioned on the exposed outer face of 28 defined by window 30 and window 26 of the PCBA, where window 30 is smaller than window 26. Over-molding of the plastic layer 62 may occur after soldering the set of end tabs 29 of FIG. 6A. As shown in FIGS. 1 and 5, the PCBA 24 may include the solder points 31 at particular internal locations, e.g., for the purpose of voltage sensing of the battery cells 12. One or more of the electrical connectors 40 may be used as part of the PCBA 24 to enable connection of the PCBA 24 to an external device, e.g., a battery assembly controller, with an example end placement of the electrical connector 40 depicted in FIG. 5.

As will be appreciated by one of ordinary skill in the art in view of the foregoing description, the PCBA 24 described herein enables construction of a battery assembly, such as the exemplary battery assembly 10 of FIGS. 1 and 2, with integral monitoring and welding assembly features included in the overall construction of the PCBA 24. The PCBA 24 may facilitate laser welding of lap joints, for instance, and thus the formation of robust welds having lower-resistance. This in turn may help increase the volumetric efficiency/energy density of the battery assembly 10 of FIG. 1.

The disclosure also enables a method for forming the battery assembly 10 of FIG. 1. For instance, a cell tab 16 of the battery cell 12 may be inserted through the tab slot 25 defined by the conductive bus bar 22 and thereafter folding or bending the cell tab 16 as shown in FIG. 2, with multiple such cell tabs 16 all folded or bent in the same direction. The bending action forms the tab portion 16A as a first portion extending through the tab slot 25 and the exposed tab portion 16B arranged orthogonally with respect to tab portion 16A, such that the contact surface 17 of exposed tab portion 16B rests on or is positioned immediately adjacent to the conductive bus bar 22. The enabled method may include mounting the PCBA 24 to the conductive bus bar 22. The PCBA 24 is primarily mechanically attached to the carrier frame 14F around the perimeter of the PCBA 24. The PCBA 24 may or may not have a mechanical connection to the bus bar 22, except through the welded joint 45 and any secondary welded joints 420. The bus bars 22 are aligned with the carrier frame 14F and the PCBA 24 is aligned by notches in the carrier frame 14F. Thus by transitive property, since the bus bar 22 and the carrier frame 14F share the same reference features on the carrier frame 14F, the welding windows 26 of the PCBA 24 can be aligned correctly to the cell tabs 16. Thereafter, the method may include welding the exposed portions 16B of the cell tabs 16 to the conductive bus bar 22 along a length of the welding window 26, e.g., using a laser welding process, with the resultant welded joints 45 depicted schematically in FIG. 5.

The conductive bus bar 22 may be supported with the carrier frame 14F of FIG. 4, in which case the method may include connecting the resilient spring element 28 of FIGS. 6A and 6B to the PCBA 24 as part of the PCBA 24 adjacent to the carrier frame 14F, such that the resilient spring element 28 spans most of the width (dimension D1) of the PCBA 24 as depicted in FIG. 6B. When the PCBA 24 is constructed, spring element 28 is positioned and through-hole soldered to the PCBA 24, such that the welding window 30 will always be aligned with the welding window 26. Window 30 may or may not be smaller than window 28. However, if a secondary welded joint 420 is formed to permanently secure the spring element 28 to the cell tab 16, then welding window 30 is smaller than welding window 26. Positioning the spring element 28 adjacent to the carrier frame 14F may include engaging the snap features 44 noted above.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery assembly comprising:
   a battery cell having a pouch and a cell tab, the cell tab having a first portion extending outward from a perimeter edge of the pouch and a second portion extending from the first portion, and the second portion is arranged orthogonally with respect to the first portion;
   a conductive bus bar defining a slot in which the first portion of the cell tab is disposed through the slot of the conductive bus bar, wherein the conductive bus bar has a major surface located immediately adjacent to the second portion of the cell tab; and
   a printed circuit board assembly (PCBA) having a longitudinal axis and defining a window that is orthogonal to the longitudinal axis, wherein the PCBA is positioned adjacent to the conductive bus bar, such that part of the second portion of the cell tab is exposed through the window of the PCBA, wherein the second portion of the cell tab is welded to the conductive bus bar within the window of the PCBA.

2. The battery assembly of claim 1, further comprising:
   a carrier frame connected to the PCBA, and configured to support and retain the PCBA and the conductive bus bar; and
   wherein the PCBA includes a resilient spring element adjacent to the carrier frame and spanning across a portion of a width of the PCBA.

3. The battery assembly of claim 2, wherein the resilient spring element defines another window that is coextensive with the window of the PCBA.

4. The battery assembly of claim 3, wherein the resilient spring element includes a set of tabs that are soldered to a layer of the PCBA.

5. The battery assembly of claim 1, wherein the battery cell includes a plurality of battery cells, and the conductive bus bar includes a plurality of conductive bus bars, and wherein at least one cell tab of the plurality of battery cells is constructed of a different material than the conductive bus bars.

6. The battery assembly of claim 1, wherein the PCBA includes a first layer configured as a functional electrical layer of the PCBA and a second layer that is over-molded to the first layer, with the first and second layers both defining the window of the PCBA.

7. A printed circuit board assembly (PCBA) for use with a battery assembly having a battery cell, the battery cell having a cell tab that includes orthogonally-arranged first and second portions, the battery assembly further having a conductive bus bar defining a slot that the first portion extends through, the PCBA comprising:
   a first layer forming a functional electrical layer of the PCBA; and a second layer over-molded to the first layer, the first and second layers defining a window that is orthogonal with respect to a longitudinal axis of the PCBA, wherein the window of the PCBA is configured such that, when the PCBA is mounted to the conductive bus bar, part of the second portion of the cell tab is exposed through the window.

8. The PCBA of claim 7, wherein the battery assembly further includes a carrier frame connected to the PCBA, and configured to support and retain the PCBA and the conductive bus bar, the PCBA further comprising:
a resilient spring element soldered to the PCBA and spanning a portion of a width of the PCBA.

9. The PCBA of claim 8, wherein the resilient spring element defines another window that is coextensive with the window of the PCBA.

10. The PCBA of claim 8, wherein the resilient spring element includes a set of tabs that are soldered to the first layer of the PCBA.

11. A method for forming a battery assembly, the method comprising:
inserting a cell tab of a battery cell through a slot defined by a conductive bus bar having a major surface;
bending the cell tab to form a first portion disposed through the slot and a second portion arranged orthogonally with respect to the first portion, such that the major surface of the conductive bus bar is immediately adjacent to the second portion of the cell tab;
positioning a printed circuit board assembly (PCBA) adjacent to the conductive bus bar, the PCBA having a longitudinal axis and defining a window that is orthogonal with respect to the longitudinal axis, such that part of the second portion of the cell tab is exposed through the window; and
welding the second portion of the cell tab to the conductive bus bar through the window to thereby form the battery assembly.

12. The method of claim 11, further comprising:
supporting and retaining the PCBA and the conductive bus bar with a carrier frame.

13. The method of claim 11, further comprising:
soldering a resilient spring element to the PCBA.

14. The method of claim 13, wherein the resilient spring element defines another window, further comprising: positioning the resilient spring element adjacent to a carrier frame such that the window of the resilient spring element is coextensive with the window of the PCBA.

15. The method of claim 13, wherein the resilient spring element includes a set of end tabs, and wherein soldering the resilient spring element to the PCBA includes soldering the set of end tabs to the PCBA.

16. The method of claim 15, further comprising overmolding a plastic layer onto the PCBA after soldering the set of end tabs.

17. The method of claim 11, wherein bending the cell tab includes passing a cylindrical roller along the longitudinal axis of the battery assembly in direct rolling contact with the cell tab.

18. The method of claim 17, wherein the cell tab includes a plurality of cell tabs, and wherein bending the cell tabs includes bending each respective cell tabs of the plurality of cell tabs in the same direction.

* * * * *